(12) United States Patent
Landon

(10) Patent No.: US 8,293,311 B2
(45) Date of Patent: *Oct. 23, 2012

(54) REFRIGERATION-TEMPERATURE SPREADABLE BUTTER-BASED PRODUCT

(75) Inventor: Todd Landon, Mound, MN (US)

(73) Assignee: Land O'Lakes, Inc., Arden Hills, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/089,028

(22) Filed: Apr. 18, 2011

(65) Prior Publication Data

US 2011/0195173 A1     Aug. 11, 2011

Related U.S. Application Data

(63) Continuation of application No. 11/592,587, filed on Nov. 3, 2006, now Pat. No. 7,927,646.

(51) Int. Cl.
*A23C 15/00* (2006.01)
(52) U.S. Cl. ......... 426/581; 426/580; 426/663; 426/664
(58) Field of Classification Search .................. 426/580, 426/581, 586, 663, 664
See application file for complete search history.

(56) References Cited

U.S. PATENT DOCUMENTS

| | | |
|---|---|---|
| 3,490,919 A | 1/1970 | Moran et al. |
| 3,519,435 A | 7/1970 | MacCollom |
| 3,889,004 A | 6/1975 | Schmidt et al. |
| 3,917,859 A | 11/1975 | Terada et al. |
| 4,366,180 A | 12/1982 | Altrock et al. |
| 4,513,017 A | 4/1985 | Moran et al. |
| 4,515,825 A | 5/1985 | Moran et al. |
| 4,769,255 A | 9/1988 | Ahmed et al. |
| 4,839,190 A | 6/1989 | Bumbalough |
| 4,954,362 A | 9/1990 | Wesdorp et al. |
| 5,077,077 A | 12/1991 | Suzuki et al. |
| 5,279,847 A | 1/1994 | Okonogi et al. |
| 5,332,595 A | 7/1994 | Gaonkar |
| 6,173,267 B1 | 1/2001 | Cairns |

*Primary Examiner* — Leslie Wong
(74) *Attorney, Agent, or Firm* — Dorsey & Whitney LLP; Bridget M. Hayden, Esq.

(57) ABSTRACT

A method of forming a butter product comprises forming a primary oil-in-water emulsion by dispersing liquefied stearine butterfat in a butter serum, the liquefied stearine butterfat forming stearine globules within the butter serum. The primary oil-in-water emulsion is dispersed into an olein butterfat component forming an oil-in-water-in-oil emulsion, and the oil-in-water-in-oil emulsion being cooled to form the butter product which is spreadable at a temperature of less than about 45° F.

8 Claims, 2 Drawing Sheets

REFRIGERATION-TEMPERATURE SPREADABLE BUTTER-BASED PRODUCT

CROSS-REFERENCE TO RELATED APPLICATIONS

This application is a continuation of U.S. application Ser. No. 11/592,587 filed on Nov. 3, 2006, issued on Apr. 19, 2011 as U.S. Pat. No. 7,927,646, which application is hereby incorporated by reference in its entirety.

BACKGROUND OF THE INVENTION

The present invention generally relates to a butter-type product that is spreadable at low temperatures. More specifically, the present invention relates to a butter product containing an oil-in-water-in-oil emulsion that is spreadable at temperatures of about 45° F. and remains spreadable following repeated exposure to temperatures of about 45° F. to about 80° F. The present invention further includes methods of making the butter-type product.

Many attempts have been made to produce low temperature spreadable butters or butters that are spreadable at temperatures of about 32° F. to about 45° F.

Most of the attempts include the use of three to four or more fractionation components derived from butter at a variety of temperatures that yield enough olein/stearine fractions that can be blended in varying ratios to produce a low temperature spreadable butter. Unfortunately, only a small portion of the fractionation components are used during production with the rest requiring disposal or utilization through foodservice and food distribution outlets in order to keep the process economical. In addition, multiple fractionation steps are cumbersome and time consuming.

Furthermore, attempts to produce low temperature spreadable butters or butter-based products often include the addition of stabilizers, gums and other texture modifiers to produce butter-based products. Low temperature spreadable butters containing such additives cannot legally be defined as "butter" according to United States Department of Agriculture (USDA) definitions.

Additionally, use of processing steps in which high-fat cream undergoes phase inversion to butter have also been attempted. Such methods often result in dairy products that are unstable and do not remain spreadable particularly after exposure to fluctuating temperature conditions.

SUMMARY OF THE INVENTION

The present invention includes a method of forming a butter-based product that is spreadable at refrigeration temperatures by dispersing a high melting (stearine) butterfat component into a butter serum or dairy protein solution to form a primary emulsion. The primary emulsion is then dispersed into an olein butterfat component to form a secondary emulsion. The secondary emulsion is cooled to a temperature that ranges from about 33° F. to about 38° F. to form the butter-based product that is spreadable at refrigeration temperatures.

The present invention also includes a butter-based product which is an oil-in-water-in-oil emulsion, having a primary emulsion comprising stearine globules within an aqueous butter serum, the majority of the stearine globules ranging in size from about 2 to about 5 microns, the primary emulsion dispersed within an olein butterfat continuous phase.

DETAILED DESCRIPTION

The present invention includes a butter product that is spreadable at temperatures from about 32° F. to about 45° F. (refrigeration temperatures) and remains stable following exposure to cycling temperatures of about 45° F. to about 72° F. The butter product is an oil-in-water-in-oil emulsion (o/w/o), with an internal oil-in-water emulsion as a primary emulsion and an outer continuous oil phase forming a secondary emulsion, the o/w/o emulsion. The primary emulsion is foamed by dispersing and stabilizing a higher melting milk-fat fraction in an aqueous butter serum. The secondary emulsion consists of a lower melting milk-fat fraction that acts as a continuous phase surrounding the primary emulsion.

Stabilization of the primary emulsion is accomplished through several factors. A high melting milk-fat fraction is dispersed into the butter serum component. The dispersed high melting milk-fat fraction globules are reduced in size primarily to about 2 to 5 microns within the aqueous butter serum. Naturally occurring emulsifiers (phospholipids and milk proteins) in the butter serum aid in stabilizing the size reduced high melting milk-fat globules. The butter serum may also be provided by re-hydrating buttermilk powder or skim milk powder. The surface area between the dispersed high melt milk-fat globules and the serum continuous phase is dramatically increased. This increase in surface area aids in stabilizing the primary phase by increasing the viscosity of the overall primary phase, which reduces the rate of gravity separation even though the primary phase is above the melting point of the high melt milk-fat fraction.

The continuous phase of the secondary emulsion consists of a lower melting milk-fat fraction. The primary emulsion is dispersed into this lower melting oil fraction, forming the secondary emulsion.

Figure 1:
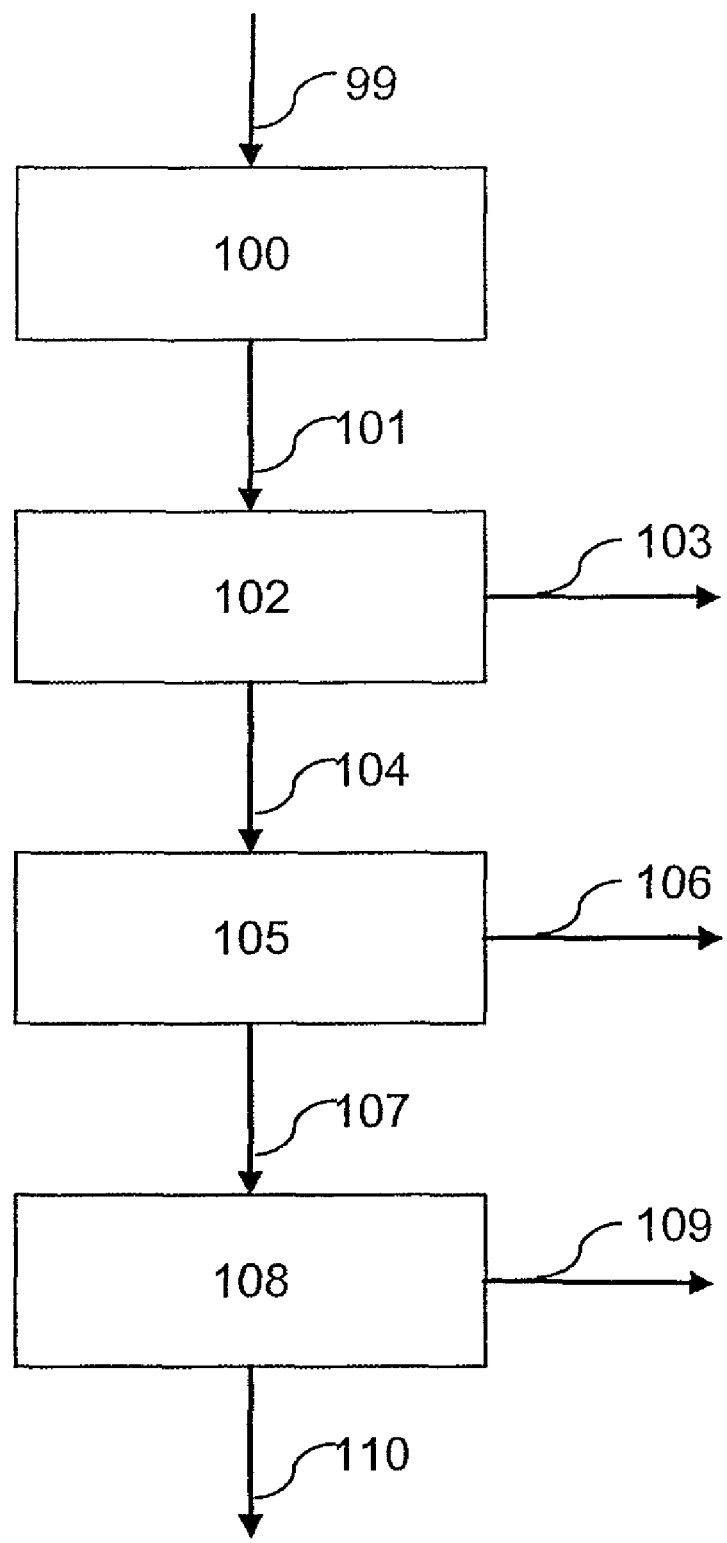
FIG. 1 is a schematic of a process of producing the component of the present invention.

The higher melting and the lower melting milk-fat fractions are derived as illustrated in FIG. 1. Butter 99 is typically melted by heating to a temperature of at least about 140° F. in 100 to remove all fat crystals and may generally have any butterfat concentration within the USDA legal definition of butter. Alternatively, butter 99 is freshly churned butter or butter that has been produced no more than about eight hours prior to being processed according to the process. In addition, butter that has been heated to reduce the moisture content and increase the solids content may also be used as butter 99 and processed in accordance with the process. For example, grade AA butter that is heated to a temperature above about 170° F. for about 2 to about 3 hours may be used as butter 99 when practicing the present invention.

Melted butter 101 having a butterfat concentration of about 80 to about 85 weight percent, based on the total weight of butter 101 is separated in a separator 102, such as a gravity or mechanical separation equipment to form a liquid butter serum fraction 103 and a butterfat fraction 104. Alternatively, fresh cream may be processed through a separator to produce the liquid butterfat 104. A suitable example of a separator is BMRPX-S314 centrifuge that may be obtained from Alfa-Laval Separation Inc., of Warminster, Pa. Also alternatively, anhydrous milkfat (AMF) or butteroil may be utilized. The liquid butterfat component 104 has a fat concentration of about 95 to 100 percent, based on the total weight of the butterfat 104.

After separating, the butterfat 104 is warmed to a temperature above about 140° F. and transferred into a first crystallizer 105 that slowly cools the butterfat fraction according to crystallization curves of the butterfat 104 to a temperature of about 57° F. to about 92° F. Alternatively, the butterfat component 104 may be crystallized to a temperature range of about 57° F. to about 79° F. when practicing the present invention.

The first crystallizer 105 is typically jacketed and equipped with agitating devices that control the temperature of, and mix the butterfat component 104 during crystallization to produce a mixture of two butterfat fractions having different melting/crystallizing profiles. The two butterfat fractions include a higher melting crystallized (or a first to crystallize) butterfat fraction 106 and a lower-melt butterfat fraction 107.

The higher melting crystallized butterfat component 106 may be characterized as a stearine butterfat fraction since the higher melting crystallized butterfat component 106 contains a higher-melting solid or crystallized milk-fat portion after crystallization of the butterfat fraction 104. As used herein, the term "stearine" refers to the solid fat product that remains after crystallization or separation of a fat mixture based on melting points.

Next, the higher melting crystallized butterfat component 106 is separated from the first lower-melt butterfat fraction 107 using a separator 105, such as several layers of cheesecloth, separating at the same temperature range that is used in crystallizer 105 so that little, if any change in the melting/crystallizing profiles of higher melting crystallized butterfat component 106 and first liquid butterfat fraction 107 occurs. The cheesecloth retains the crystallized butterfat component 106 while allowing the fluid butterfat fraction 107 to pass through. Alternatively, a conventional horizontally-oriented plate and frame press may be used to separate butterfat component 106 from butterfat fraction 107 when practicing the present invention.

Next, the first lower-melt butterfat fraction 107 is warmed to a temperature range of about 120° F. to about 125° F. After warming, the first liquid butterfat fraction 107 is transferred into a second crystallizer 108 that cools the first liquid butterfat fraction 107 to a crystallization temperature profile that crystallizes a portion of the liquid butterfat fraction 107 to a temperature range of about 46° F. to about 55° F. to form a second intermediate-melt crystallized butterfat fraction 109, and a lower melting liquid (olein) butterfat component 110.

The intermediate-melt butterfat fraction 109 is separated from the lower melting liquid butterfat component 110 through the use of several layers of cheesecloth or any conventional horizontally-oriented plate and frame press under substantially the same temperature conditions that are used to crystallize the fluid butterfat fraction 107 so that little if any change to the melting/crystallizing profiles occur. The crystallized butterfat fraction 109 generally has a butterfat concentration of at least 95 weight percent and preferably more than about 98 weight percent, based on the total weight of the butterfat fraction 109. Similarly, the fluid lower melting butterfat component 110 generally has a butterfat concentration of at least 95 weight percent and preferably more than about 98 weight percent, based on the total weight of the butterfat component 110.

The lower melting liquid butterfat component 110 may be characterized as an olein butterfat fraction since the lower melting liquid butterfat component 110 is a lower-melting liquid milk-fat fraction obtained after crystallization or separation of butterfat based on melting points. By "lower-melting" is meant having a lower melting point than the higher-melting milk-fat of the first crystallized butterfat component 106. Additionally, as used herein, the term "olein butterfat fraction" refers to any liquid fraction obtained following crystallization or separation of butterfat based on melting point.

The first crystallizer 105 may serve as the second crystallizer 108 when practicing the present invention as long as the first crystallizer 105 is operated under conditions that promote crystallization at a temperature of no more than 92° F. and no less than 57° F. in one step and no more than 55° F. to no less than 46° F.) in the second step.

Figure 2:
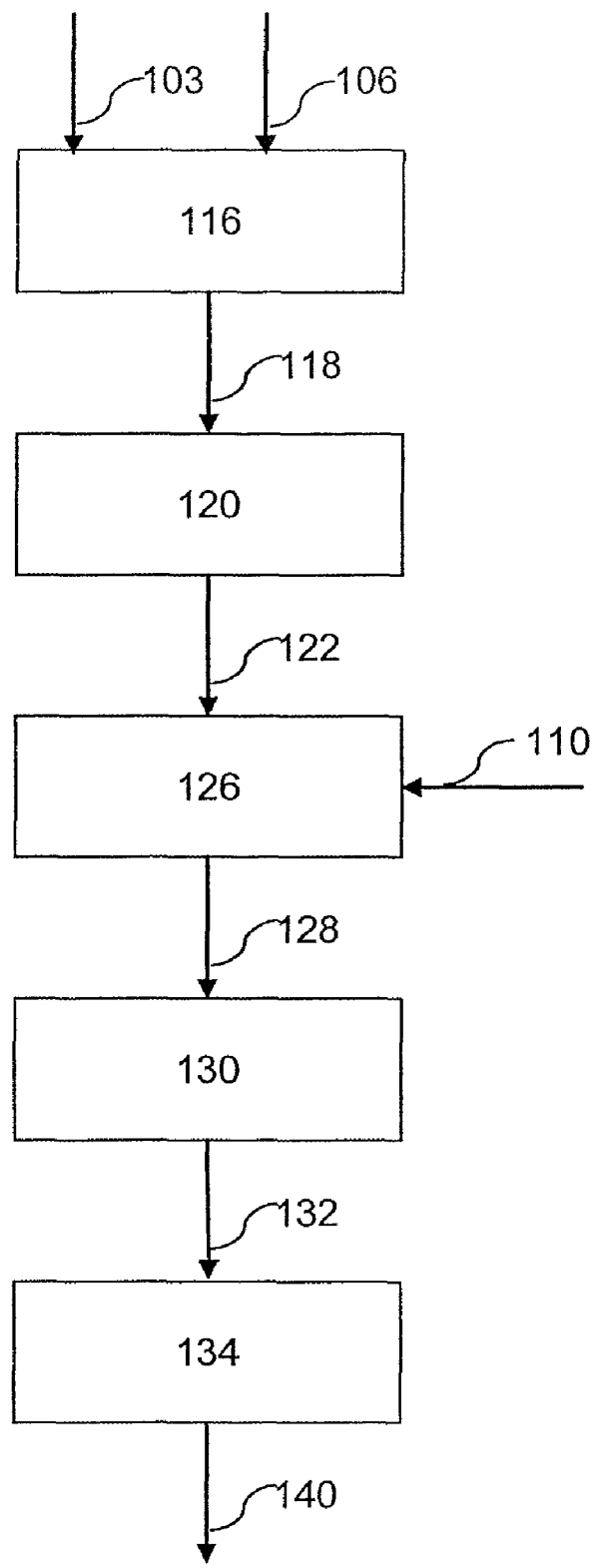
FIG. 2 is a schematic of a process of producing a butter-based product utilizing the component made according to the process of FIG. 1.

The higher melt butterfat component and butter serum component are recombined in a process generally depicted in FIG. 2. A higher melt butterfat component 106 such as crystallized butterfat having a crystallization temperature that ranges from about 57° F. to about 92° F., is slowly blended into butter serum 103 in a blend tank 116 to form a primary phase emulsion 118 (a high-melt oil-in-water emulsion). Alternatively, butter serum may be replaced with rehydrated forms of condensed or dried buttermilk or skim milk powders. Additives such as salt, vitamins such as vitamin A, minerals, spices, flavoring agents and the like may be included as part of the butter serum 103 when practicing the present invention.

The weight ratio of the higher melt butterfat component 106 to butter serum 103 in the primary emulsion 118 may generally range from about 47:53 (fat:serum) to about 65:35 (fat:serum) so that the emulsion 118 contains a maximum amount of the higher melt butterfat component 106. When the concentration of higher melt butterfat component 106 is more than about 65 weight percent, based on the total weight of the primary emulsion 118, the continuous aqueous phase is overcome or "saturated" with the fat phase, and destabilization can occur, especially during further processing. By "destabilization" is meant (1) separation of the fat phase from the primary emulsion 118, and/or (2) aggregation or agglomeration of fat globules of the fat phase due to loss or removal of the thin layer of the aqueous phase between and around the fat globules.

The temperature of the higher melt butterfat component 106 prior to forming the primary emulsion 118 is typically about 90° F. and then raised to a temperature range of about 140° F. to 150° F. before addition to the butter serum 103. The butter serum 103 is at a temperature that generally ranges from about 70° F. to about 90° F. prior to addition of the higher melt butterfat component 106. After blending, the primary emulsion 118 is at a temperature that ranges from about 125° F. to about 140° F. Additionally, a LIGHTNIN® mixer (General Signal Corporation of Stamford, Conn.), a hand-held mixer or a serrated blade mixer is typically used to blend the higher melt butterfat component 106 into the butter serum 103.

The primary emulsion 118 is processed through a homogenizer 120, such as a conventional fluid dairy homogenizer operating at a pressure of about 300 to about 500 psi and a temperature of about 120° F. to about 150° F. to reduce the size of the fat globules that are present in the primary emulsion 118 to a cross-sectional diameter of primarily about 2 to about 5 microns. The homogenizer 120 stabilizes or sets the emulsion 118 and forms a stabilized oil-in-water emulsion 122 by reducing the size of, and further dispersing the fat globules into the butter serum 103 of the primary emulsion 118. Alternatively, a hand-held homogenizer, a serrated blade mixer or any apparatus that reduces the size of fat globules and forms globules having a cross-sectional diameter of about 2 to about 5 microns could be used.

The homogenizer 120 is typically pre-heated with warm water prior to homogenizing the primary emulsion 118 so that changes to the fat crystalline profile of the primary emulsion 118 do not occur. The primary emulsion 118 is passed through the homogenizer 120 one or more times when practicing the present invention so that the stabilized primary emulsion 122 contains small fat globules of the fat phase 106 dispersed in the aqueous phase 103.

After homogenization, the stabilized primary emulsion 122 is added at a temperature range of approximately 135° F. to 145° F. into the lower melting liquid butterfat component 110. The lower liquid melting butterfat component 110 is held at a temperature range of 40-60° F. during the addition of the primary stabilized emulsion 122 and acts as a continuous phase. The lower melting liquid butterfat component 110 is maintained at the lower temperature range using jacket cooling of the tank and agitation. The result is a secondary oil-in-water-in-oil emulsion 128 with the dispersed droplets of 122 having a cross-sectional diameter of about 5 to about 40 microns after dispersion into the lower melting liquid butterfat component 110.

The dispersion of the stabilized primary phase into the lower melting liquid butterfat component occurring at a temperature range of about 40° F. to about 60° F. (1) does not favor reaction or agglomeration of the higher melting butterfat component 106 with the lower melting butterfat component 110, and (2) is low enough to initiate fat crystal formation in the lower melting butterfat component 110 so that the viscosity of the lower melting butterfat component 110 is increased. Increasing the viscosity of the lower melting butterfat component 110 helps reduce the size of the droplets of emulsion 122 and enhances stability of the emulsion 122 in the secondary emulsion 128.

If the cross-sectional diameter of emulsion 122 does not fall into the range of about 10 to about 30 microns, the secondary emulsion 128 may optionally be processed through a second mixer-shearing device 130, such as a LIGHTNIN® mixer that reduces the particle size of the primary emulsion 122 dispersed in the secondary emulsion 128 to the cross sectional diameter of about 10 to about 30 microns. Alternatively, the second mixer-shearing device 130 includes a serrated blade mixer operated at about 905 RPM. The mixing device is operated at a low speed to keep shear low so as not to excessively break up the primary emulsion globules as they become more susceptible to disruption as the higher melt butterfat component crystallizes within the primary emulsion as it is dispersed within the cooled continuous phase-low-melt-olein-butterfat component.

After formation, the secondary emulsion 128 (or optionally 132) is transferred to a crystallizer 134, such as a scraped surface heat exchanger that shears the emulsion 128 at operational speeds of about 20 RPM to about 50 RPM and cools the emulsion 128 to a temperature of about 33° F. to 38° F. After crystallization, a butter-based product 140 is fowled that is spreadable at refrigeration temperatures.

An example of a suitable crystallizer is a Votator II Scraped Surface Heat Exchanger that may be obtained from Waukesha Cherry-Burrell of Delavan, Wis. The conditions of the crystallizer 134 are effective to plasticize the emulsion 128 and form the butter-based product 140 having the desired smooth semi-solid consistency.

As a result, the butter-based product 140 that is formed in accordance with the present invention is a dairy product legally defined as "butter". The butter-based product 140 has a continuous fat matrix that changes from semi-solid to liquid rapidly when removed from refrigeration temperatures and develops little, if any, amounts of solid fat when stored at refrigeration temperatures.

After cooling, the butter-based product 140 may be texturized in a texturizer, such as a pin mixer. In addition, nitrogen gas may also be introduced into the butter-based product 140 to produce a finer, smoother butter-based product. After texturizing, the butter-based product may be packaged in any conventional packaging equipment to yield a packaged butter-based product (not shown).

The butter-based product 140 has been found to exhibit a high degree of room temperature emulsion stability. By "high degree of room temperature emulsion stability" is meant essentially no separation of any oil from the continuous phase and no separation of serum from the dispersed primary phase is observed.

In addition, the butter-based product 140 has a good temperature cycling stability such that when the product 140 is warmed to ambient room temperatures and then cooled to refrigeration temperatures or below, the product 140 does not exhibit increased hardening due to fat recrystallization. Additionally, the product 140 has good freeze/thaw stability in that the product 140 does not substantially change after being stored at about 25° F. to about 30° F.

The butter-based product 140 also has penetrometer values that are at least about two to about three times greater than typical Grade AA butter. As an example, the butter-based product 140, when at a temperature of about 72° F. or a temperature of about 39° F., exhibits penetrometer values ranging from at least about 85 mm/10/6 seconds to as much as 135 mm/10/6 seconds or greater. In another example, the butter-based product 140 penetrometer value is at least about 95 min/10/6 seconds at 39° F.

The present invention is more particularly described in the following Examples which are intended as an illustration only since numerous modifications and variations within the scope of the present invention will be apparent to those skilled in the art.

EXAMPLES

Example 1

This is an example demonstrating production of a butter-based product that is spreadable at refrigeration temperatures in accordance with the present invention. In this example, U.S. Grade AA butter was separated into butterfat and butter serum. Next, the butterfat was melted at a temperature of about 140° F. to about 145° F. to remove all traces of fat crystalline structure. After melting, the butterfat was introduced into a crystallizer that slowly reduced the temperature of the butterfat to about 78° F. with slow mixing to form a first fat mixture containing crystallized and fluid fat. The crystallized fat, designated as "78(S) butterfat material" was separated from the fluid fat mixture, designated as the "78(L) butterfat material" by filtering through a cheesecloth. About 50 weight percent of 78(S) butterfat material and about 50 weight percent of 78(L) butterfat material were separated from each other.

Next, the 78(L) butterfat material was melted by heating to a temperature of about 120° F. to about 125° F., and then cooled down to about 62.5° F. in a crystallizer to produce a second fat mixture containing crystallized and fluid fat. The second fat mixture was separated with cheesecloth into crystallized fat material designated as "62.5 F(S) butterfat material" and fluid fat material designated as "62.5(L) butterfat material".

Next, about 20 weight percent of butter serum having a temperature of about 140° F. was placed in a stainless steel mixing vessel to which a serrated blade mixer was attached. The mixing vessel was held at a temperature of about 135 to 145° F. Next, about 30 weight percent of 78(S) butterfat was melted to a temperature of about 140° F. The 78(S) butterfat material was slowly added to the butter serum with mixing to form a primary oil-in-water emulsion. The primary emulsion had a temperature of about 130° F. and was then transferred from the mixing vessel into a homogenizer that had been preheated. The primary emulsion was homogenized. Homogenization was effective to produce fat globules having a cross-sectional diameter of primarily about 2-5 microns when viewed under a microscope.

Next, a second stainless steel mixing vessel was transferred to a cold water/ice bath and fitted with a serrated blade mixer. About 50 weight percent of the 62.5(L) butterfat material was added to the mixing vessel and cooled to 55° F. The cooling of 62.5(L) butterfat material to 55° F. was enough to initiate crystallization of the 62.5(L) component. Next, the stabilized primary emulsion was slowly added to the 62.5(L) butterfat mixture with mixing to form a secondary emulsion containing an oil-in-water-in-oil emulsion having a temperature of about 62° F. After adding the stabilized primary emulsion, the secondary emulsion was sheared using the serrated blade mixer set to operate at a speed of 2729 RPM. After mixing, the secondary emulsion was cooled to 40° F. and then re-sheared at 1264 RPM to yield a butter-based product having a penetrometer value of about 105 to about 110 mm/10/6 seconds after being stored at 39° F. Shearing was also effective to form stearine-fat-containing serum droplets having a cross-sectional diameter of about 25 microns. The butter-based product was firm to yield, but soft to spread once moved.

Example 2

This is an example demonstrating production of a butter-based product that is spreadable at refrigeration temperatures in accordance with the present invention. In this example, U.S. Grade AA salted butter was separated into butterfat and butter serum. Next, the butterfat was melted at a temperature of about 140° F. to about 145° F. to remove all traces of fat crystalline structures. After melting, the butterfat was introduced into a crystallizer that slowly reduced the temperature of the butterfat to about 72° F. with slow mixing to form a first fat mixture containing crystallized and fluid fat. The crystallized fat, designated as "72(S) butterfat material" was separated from the fluid fat mixture, designated as the "72(L) butterfat material" by filtering through a cheesecloth.

Next, the 72(L) butterfat material was melted by heating to a temperature of about 120° F. to about 125° F., and then cooled down to about 50° F. in a crystallizer to produce a second fat mixture containing crystallized and fluid fat. The second fat mixture was separated with cheesecloth into crystallized fat material designated as "10° C.(S) butterfat material" and fluid fat material designated as "10° C.(L) butterfat material".

Next, about 20 weight percent of salted butter serum having a temperature of about 90° F. was placed in a stainless steel mixing vessel to which a serrated blade mixer was attached. Next, about 28 weight percent of 72(S) butterfat material was melted to a temperature of about 145° F. and added to the butter serum in the mixing vessel. The 72(S) butterfat material was slowly added to the butter serum with mixing to form about a primary oil-in-water emulsion having a temperature of about 120° F. The primary emulsion was then transferred from the mixing vessel into a homogenizer that had been preheated with hot water. The primary emulsion was homogenized at pressures effective to produce fat globules having a cross-sectional diameter of about 2 micron to about 5 microns when viewed under a microscope.

Next, a second stainless steel mixing vessel was transferred to a cold water/ice bath and fitted with a serrated blade mixer. About 52 weight percent of the 10° C.(L) butterfat material was added to the mixing vessel and cooled to about 55° F. and the 10° C.(L) butterfat material turned cloudy, signifying initiation of crystallization. Next, the stabilized primary emulsion was slowly added to the 10° C.(L) butterfat mixture with mixing at a speed of about 905 RPM to form a secondary emulsion yielding an oil-in-water-in-oil emulsion. After mixing and additional cooling to about 39° F., the secondary emulsion was sheared using the serrated blade mixer set to operate at a speed of 2386 RPM to yield a butter-based product.

Example 3

This is an example demonstrating production of a butter-based product that is spreadable at refrigeration temperatures in accordance with the present invention. In this example, U.S. Grade AA salted butter was separated into butterfat and butter serum. Next, the butterfat was melted at a temperature of about 140° F. to about 145° F. to remove all traces of fat crystalline structures. After melting, the butterfat was introduced into a crystallizer that slowly reduced the temperature of the butterfat to about 57.2° F. with slow mixing to form a first fat mixture containing crystallized and fluid fat. The crystallized fat, designated as "14(S) butterfat material" was separated from the fluid fat mixture, designated as the "14(L) butterfat material" by filtering through a cheesecloth.

Next, the 14(L) butterfat material was melted by heating to a temperature of about 120° F. to about 125° F., and then cooled down to about 46.4° F. in a crystallizer to produce a second fat mixture containing crystallized and fluid fat. The second fat mixture was separated with cheesecloth into crystallized fat material designated as "8° C.(S) butterfat material" and fluid fat material designated as "8° C.(L) butterfat material".

Next, about 20 weight percent of salted butter serum having a temperature of about 90° F. was placed in a stainless steel mixing vessel to which a serrated blade mixer was attached. Next, about 30 weight percent of 14(S) butterfat material was melted to a temperature of about 145° F. and added to the butter serum in the mixing vessel. The 14(S) butterfat material was slowly added to the butter serum with mixing to form a primary oil-in-water emulsion having a temperature of about 130° F. The primary emulsion was then transferred from the mixing vessel into a homogenizer that had been preheated. The primary emulsion was homogenized by passing the emulsion through the homogenizer twice at different pressure settings. The first pressure setting was lower than the second setting and homogenization was effective to produce fat globules having a cross-sectional diameter of about 2 microns to about 5 microns when viewed under a microscope.

Next, a second stainless steel mixing vessel was transferred to a cold water/ice bath and fitted with a side wall scraper to remove crystallizing fat from the wall of the mixing vessel. About 50 weight percent of the 8° C.(L) butterfat material was added to the mixing bowl and cooled to about 55° F. Next, the stabilized primary emulsion at a temperature of about 135° F. to about 145° F. was slowly added to the 8° C.(L) butterfat mixture with mixing to form a secondary emulsion yielding an oil-in-water-in-oil emulsion. After mixing, the secondary emulsion was cooled to a temperature of about 44° F. while shearing to yield a butter-based product. Shearing was also effective to form stearine-fat-containing serum droplets having a cross-sectional diameter of primarily about 10-25 microns and a sample was taken to determine the stability of the product over time. Next, the product was cooled and sheared until a temperature of about 40° F. was reached. A sample was taken to determine the stability of the product over time. The product cooled to 40° F. was more viscous than the sample cooled to 44° F. however; both product samples remained stable over time.

Example 4

This is an example demonstrating production of a butter-based product that is spreadable at refrigeration temperatures in accordance with the present invention. In this example, U.S. Grade AA salted butter was separated into butterfat and butter serum. Next, the butterfat was melted at a temperature of about 145° F. to about 150° F. to remove all traces of fat crystalline structures. After melting, the butterfat was introduced into a crystallizer that slowly reduced the temperature of the butterfat to about 57.2° F. with slow mixing to form a first fat mixture containing crystallized and fluid fat. The crystallized fat, designated as "14(S) butterfat material" was separated from the fluid fat mixture, designated as the "14(L) butterfat material" by filtering through a cheesecloth.

Next, the 14(L) butterfat material was melted by heating to a temperature of about 120° F. to about 125° F., and then cooled down to about 46° F. in a crystallizer to produce a second fat mixture containing crystallized and fluid fat. The second fat mixture was separated with cheesecloth into crystallized fat material designated as "8° C.(S) butterfat material" and fluid fat material designated as "8° C.(L) butterfat material".

Next, about 20 weight percent of salted butter serum having a temperature of about 90° F. was placed in a stainless steel mixing vessel to which a serrated blade mixer was attached. Next, about 30 weight percent of 14(S) butterfat material was melted to a temperature of about 145° F. and added to the butter serum in the mixing vessel. The 14(S) butterfat material was slowly added to the butter serum with mixing to form a primary oil-in-water emulsion having a temperature of about 136° F. The primary emulsion was kept at a temperature of about 136° F. to about 140° F. and then transferred from the mixing vessel into a homogenizer. The primary emulsion was homogenized by passing the emulsion through the homogenizer. Homogenization was effective to produce fat globules having a cross-sectional diameter of about 2 microns to about 5 microns when viewed under a microscope.

Next, a second stainless steel mixing vessel was transferred to a cold water/ice bath and fitted with a mixer. About 50 weight percent of the 8° C.(L) butterfat material was added to the mixing vessel and cooled to about 46° F. Next, the stabilized primary emulsion at a temperature of about 140° F. was slowly added to the 8° C.(L) butterfat mixture with mixing to form a secondary emulsion containing an oil-in-water-in-oil emulsion. The emulsion was maintained at a temperature of about 44° F. to 48° F. to initiate and promote continuous fat phase crystallization and help reduce the fat containing serum droplet size of the primary emulsion dispersed within the continuous 8° C.(L) fat phase.

After mixing, the secondary emulsion was cooled to a temperature of about 41.7° F. while shearing to yield a butter-based product. Mixing was effective to form stearine-fat-containing serum droplets having a cross-sectional diameter of primarily about 10 to about 25 microns. The butter product showed good spreadability at refrigerated temperatures and good stability at room temperature. However, too much air was whipped into the product and therefore, the product resembled ice cream.

Although the present invention has been described with reference to preferred embodiments, workers skilled in the art will recognize that changes may be made in form and detail without departing from the spirit and scope of the invention.

What is claimed is:

1. A butter-based product comprising a primary emulsion dispersed in an oil to form an oil-in-water-in-oil emulsion, wherein when the oil-in-water-in-oil emulsion is cooled, it forms a butter product that is spreadable at refrigeration temperatures.

2. The butter-based product of claim 1, wherein the primary emulsion is dispersed in the oil when the oil is at a temperature range of 40° F. to 60° F.

3. The butter-based product of claim 1, further comprising at least one additive.

4. A method of forming a butter-based product, the method comprising:
    forming a primary oil-in-water emulsion;
    dispersing the primary oil-in-water emulsion in an oil to form an oil-in-water-in-oil emulsion, wherein when the oil-in-water-in-oil emulsion is cooled it is spreadable at refrigeration temperatures.

5. The method of claim 4, further comprising adding an additive to the oil.

6. The method of claim 4, wherein the primary oil-in-water emulsion is added to the oil when the primary oil-in-water emulsion is at a temperature range of 135° F. to 145° F.

7. The butter-based product of claim 1, wherein the primary emulsion includes oil in rehydrated forms of dried or condensed buttermilk.

8. The method of claim 4, wherein forming the primary emulsion includes oil in rehydrated forms of dried or condensed buttermilk.

* * * * *

UNITED STATES PATENT AND TRADEMARK OFFICE
CERTIFICATE OF CORRECTION

PATENT NO. : 8,293,311 B2
APPLICATION NO. : 13/089028
DATED : October 23, 2012
INVENTOR(S) : Landon Page 1 of 1

It is certified that error appears in the above-identified patent and that said Letters Patent is hereby corrected as shown below:

| Column | Line | PTO | Should Read |
|---|---|---|---|
| 5 | 49 | "butter-based product 140 is fowled that is" | -- butter based product 140 is formed that is -- |

Signed and Sealed this
Eighth Day of January, 2013

David J. Kappos
*Director of the United States Patent and Trademark Office*